Dec. 26, 1967   S. JANUS   3,359,927
BALANCING MECHANISM
Filed Jan. 14, 1965   6 Sheets-Sheet 1

INVENTOR
STANLEY JANUS

Cavanagh & Norman

Dec. 26, 1967     S. JANUS     3,359,927
BALANCING MECHANISM Filed Jan. 14, 1965     6 Sheets-Sheet 4

INVENTOR
STANLEY JANUS

Cavanagh & Norman

Dec. 26, 1967 S. JANUS 3,359,927
BALANCING MECHANISM
Filed Jan. 14, 1965 6 Sheets-Sheet 5

INVENTOR
STANLEY JANUS

Cavanagh & Norman

United States Patent Office 3,359,927
Patented Dec. 26, 1967

3,359,927
BALANCING MECHANISM
Stanley Janus, 1 Browning Ave., Apt. 2,
Toronto, Ontario, Canada
Filed Jan. 14, 1965, Ser. No. 425,389
7 Claims. (Cl. 108—2)

ABSTRACT OF THE DISCLOSURE

This specification discloses a system of balancing two or more relatively movable bodies to compensate for movement of the centre of gravity of any such body and provide substantially perfect balancing over a wide range of positions by the use of cams, cables and springs.

---

The present invention relates to a balancing mechanism which in its basic form serves the general purpose of exactly balancing a body rotatable about an axis by means of a spring associated with a cable wound on a cam, said basic form of the mechanism being susceptible to a great variety of possible uses, such as balancing small machine parts, doors, or beams of excavators, the latter application of heavy type being made possible by the use of liquid springs.

In the present invention said basic form of the balancing mechanism with one degree of freedom (such as rotation about an axis) is adapted in association with other invented operative means to the construction of a balancing mechanism with two degrees of freedom (such as independent rotations of same body about two separate axes), the practical form of the latter mechanism being a balanced drafting board with adjustable height and angle of inclination. As herein exemplified, the invention is illustrated and described in relation to the balancing of a drafting board, including means for locking said board in any set position, together with means and a manner of combination of the components of the said balancing mechanism with a desk, so as to form a single, integrated and functional unit of drafting furniture.

The main object of the present invention, both in principle and as herein exemplified, is to provide means for exact balancing with a spring, in association with a cable wound on a cam, of a body rotatable about an axis, exact balancing taking place in all positions of said body, and to apply said means to balancing of a drafting board both for change of its height and its angle of inclination. The present methods of employing springs without association with cams for balancing a drafting board provide only an approximate but not exact balancing, such as is, for instance, possible when balancing is done by weights.

A further object of the present invention is to provide simple and convenient means of adjusting the balancing mechanism for drafting board to maintain exact balancing of the board in its various positions, after the weight of said board, for which the mechanism has been set to balance originally, has been changed. The latter may happen, for instance, when a drafting machine on the board has been exchanged for another one.

A further object of the present invention is to provide means for locking by a single hand control lever conveniently located both height and angle of inclination of the board.

A further object of the present invention is to provide means and a manner of combining herein described balancing mechanisms with a desk so as to occupy the least amount of space within the desk for parts of the balancing mechanism and so as to permit unobstructed use of both drafting board and desk.

With the foregoing objects in view and such other objects as will become apparent, in the following description the basic balancing mechanism and the wind-up cam are described first. Because the latter, in conjunction with other invented devices, can be incorporated in a balancing mechanism for drafting board in a number of different ways, to illustrate the invention, two different embodiments thereof are described in more detail, together with some modifications of said embodiments. The following description is to be taken together with accompanying drawings, wherein:

In the drawings.

In the drawings, the numbers of reference designate the same parts in several figures.

Figures 1, 2, 3, 4, 5:
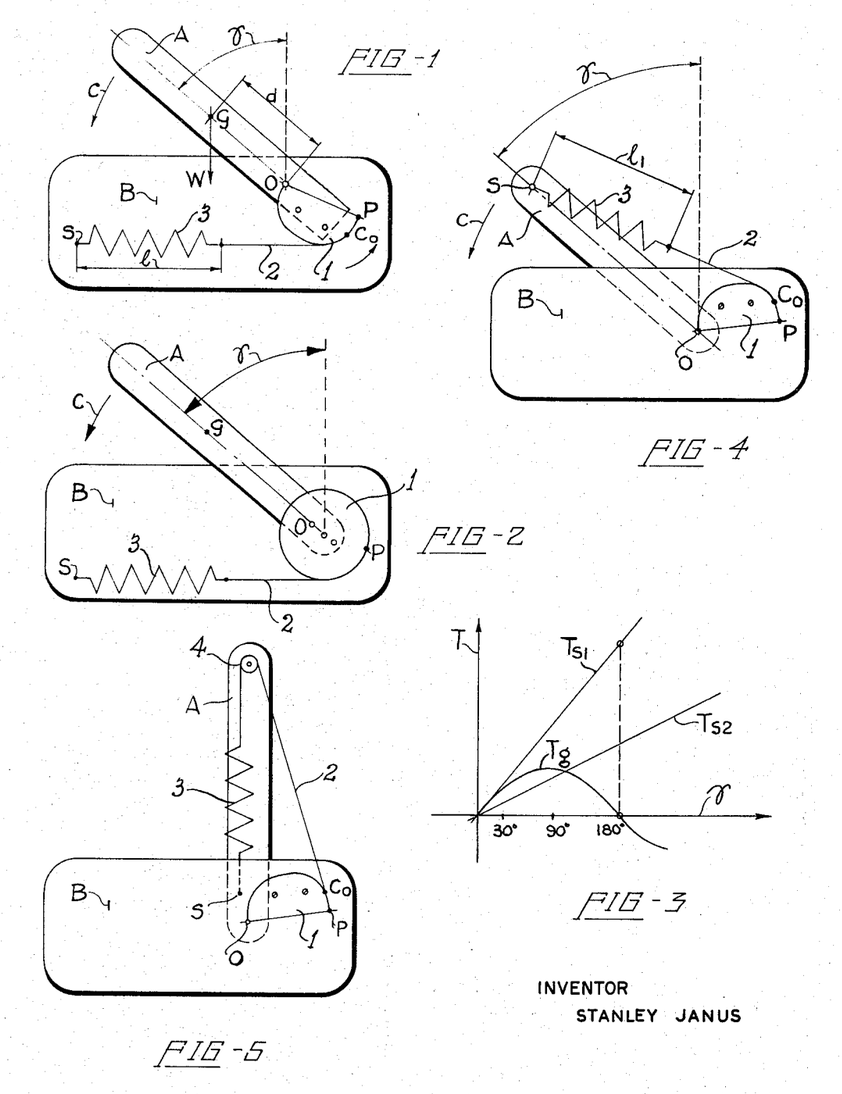
FIGURE 1 is a schematic representation of the basic balancing mechanism.
FIGURE 2 is a schematic representation of a balancing mechanism which is the same as on FIGURE 1, except that the wind-up cam is replaced by a circular wind-up pulley.
FIGURE 3 is a diagram of torques about the axis of rotation produced by springs and by gravity in mechanisms as on FIGURES 1 and 2.
FIGURE 4 is an adaptation of the basic balancing mechanism in which the wind-up cam is fastened to the base body.
FIGURE 5 is a balancing mechanism as on FIGURE 4 with a pulley added to divert the cable.

A basic balancing mechanism which makes it possible to balance exactly a rotatable body by means of a spring is depicted on FIGURE 1. An arm body A is rotatably attached about an axis to a fixed base body B, said axis of rotation, going through point O at right angles to the plane of drawing. A flat wind-up cam 1 is fastened to the arm body A at right angles to said axis of rotation. One end of a flexible, non-stretchable cable 2, a chain or the like, is attached to the cam 1 at a point P. The other end of cable 2 is attached to the free end of a tension spring 3, the other end of the latter being attached at a point S to the base body B. The cam 1, cable 2 and spring 3 will be referred to as the balancing means. When the arm body A (FIGURE 1) is rotated in the direction C, the cable 2 is wound on the curved surface of the cam 1. The centre of gravity of combined body A and cam 1 is designated as G, whereas the angle between line GO and the vertical direction is the angle of rotation $\gamma$. Variation of the angle $\gamma$ is the single degree of freedom in this basic balancing mechanism. Values of the angle of rotation $\gamma$ are restricted to values between 0 and 180 degrees which is ample for the purpose of this invention. The torque about the axis O which the spring 3 exerts on the arm body. A is of the opposite sense to that the gravity exerts on it. The main idea of the basic balancing mechanism is that the torque which the spring 3 exerts on arm body A can be regulated by varying the curvature of the wind-up cam 1, said curvature taking into account also the properties of the spring 3, thus making it possible to achieve exact balancing of arm body A for every angle of rotation $\gamma$ between 0 and 180 degrees, using springs of ordinary design, without the need for a special characteristic of the spring.

In the following we shall prove that to achieve the exact balancing of the arm body A the wind-up cam cannot be circular, then we shall determine the approximate shape of the wind-up cam and, finally, we shall explain the method of construction of the curvature of the wind-up cam with a sufficient accuracy for all practical purposes.

Designating by $T_g$ the torque about the axis of rotation exerted on the arm body A by its weight W and by $d$ the distance of the centre of gravity G from said axis of rotation, a well known relation can be written as $$T_g = Wd \sin \gamma \qquad (1)$$

On the other hand, tension F in the cable 2, caused by the deflection of the spring 3, produces a torque $T_s$ about the axis of rotation $$T_s = Ft \qquad (2)$$

where $t$ is the distance from the axis of rotation O to the cable 2, said distance being measured in the direction at right angles both to the straight line portion of the cable 2 tangent to the cam 1 and to the said axis. The body A can stay in balance only then, if the scalar values of $T_g$ and $T_s$ are equal, that is $$T_g = T_s \text{ or } Wd \sin \gamma = F \qquad (3)$$

The force F is determined by the deflection $z$ of the spring 3, said deflection being equal the difference $l_1 - l_0$, $l_1$ being the length of extended spring and $l_0$ being the free length of spring corresponding to the angle $\gamma$ equal zero. Assuming that the spring 3 has a linear characteristic, which is a practically correct assumption in the case of well designed coil tension springs, we have $$T_s = kzt \qquad (4)$$

where $k$ is a constant depending on the stiffness of the spring. In the following only the springs of a linear characteristic are meant, unless otherwise stated, although all conclusions which follow apply equally well to the springs of a quasi-linear characteristic of the type $kf(z)$, wherein $f(z)$ is a function of $z$, only the constant $k$ changing when the stiffness of the spring is changed. The latter characteristic applies with a sufficient accuracy to the most commonly used kinds of springs.

From Equations 1, 3 and 4 it follows that exact balancing of the body A can take place for a certain value of $\gamma$ only then, if for this value of $\gamma$ $$Wd \sin \gamma = kzt \text{ or } \sin \gamma = \frac{k}{Wd} zt \qquad (5)$$

If the arm member A is to be balanced for every $\gamma$ relation (5) must hold for every $\gamma$. If we shall choose the wind-up cam to be in the form of a circular wind-up pulley of radius R concentric with the axis of rotation O, so that our balancing mechanism assumes the form depicted on FIGURE 2, then the spring deflection $z$ for direction of rotation C is equal $R\gamma$ ($\gamma$ in radians) and $t$ is a constant equal R, relation (5) becoming $$Wd \sin \gamma = kR^2\gamma \qquad (6)$$

With a circular wind-up cam, the values of $\gamma$ at which exact balancing takes place, as stated above, must satisfy the Equation 6. It is very easy to see that Equation 6 cannot hold true for all values of $\gamma$ from 0 to 180 degrees. Left hand side of Equation 6 is $T_g$, whereas right hand side is $T_s$. In a geometric interpretation of Equation 6, considering $T_g$ as an independent function of $\gamma$, $T_g$ is represented by a sinusoid (FIGURE 3), while $T_s$ is represented by a straight line. The points of intersection of said straight line with said sinusoid correspond to values of $\gamma$ at which exact balancing takes place. From the diagram on FIGURE 3 the following conclusions can be drawn:

(1) With a circular wind-up cam the exact balancing for every $\gamma$ is not possible, such balancing being possible only for no more than two different values of $\gamma$.

(2) With a circular wind-up cam, by appropriately choosing the stiffness coefficient $k$ of the spring $$\left(k = \frac{Wd}{R^2}\right)$$

which in the geometric interpretation of FIGURE 3 means the appropriate choice of the angle between the straight line $T_s$ and $\gamma$ axis, it is possible to approximate the exact balancing for the values of $\gamma$ between 0 and 30 degrees. The unbalance, however, becomes quite pronounced for the values of $\gamma$ larger than 30 degrees, reaching approximately 70% of the gravitational forces at $\gamma$ equal 90 degrees and even more for the larger values of $\gamma$.

The cam curve which produces exact balancing for all values of $\gamma$ between 0 and 180 degrees, is referred to hereinafter as the "ideal cam curve."

Since for $\gamma$ equal 180 degrees $\sin \gamma$ is zero, it follows from Equation 5 that in the case of the exact balancing for the above value of $\gamma$ the distance $t$ of cable 2 from the axis of rotation O must be equal zero as well, which means that the ideal cam curve must pass through the axis of rotation O. This determines the approximate shape of the cam as that depicted on FIGURE 1.

It is further obvious from Equation 5 that any change in the values of weight W or distance $d$ (FIGURE 1) can be fully compensated for by a change of value of the stiffness coefficient $k$ of the spring without affecting Equation 5. In other words, the shape of the ideal cam curve, which is the solution of Equation 5, does not depend on the weight W or location of the centre of gravity G of the structure to be balanced. Adjusting or balancing for different weights or sizes of members to be balanced can be done by changing the stiffness coefficient $k$ of the spring.

In the basic balancing mechanism (FIGURE 1) the wind-up cam 1 rotates together with arm body A relative to the base body B, whereas the spring 3 is anchored at its one end to the base body B. The balancing mechanism depicted on FIGURE 4, which is referred to as an adaptation No. 1 of the basic balancing mechanism of FIGURE 1, is identical with that depicted on FIGURE 1, distance SO being equal in both cases, except that in the mechanism of FIGURE 4 the cam 1 is fastened to the base body B and the spring 3 is anchored to the arm body A. The movement of the spring relative to the cam is the same in mechanisms of FIGURE 1 and FIGURE 4, producing the same balancing action. Hence, a simple rule: it does not matter whether the cam rotates and the spring is stationary or the cam is stationary and the spring rotates around it with the member to be balanced. Application of this principle to a balancing mechanism of a more complex nature may result in other engineering solutions which at a first glance may appear quite different.

In the arrangement of the balancing means as on FIGURE 4, the cable 2 may be diverted by a pulley 4, resulting in an equivalent arrangement depicted on FIGURE 5. The advantage of the latter may be a more convenient location for the spring.

The shape of the ideal cam curve can be calculated analytically from Equation 5, but this method is by far too complex to be of any practical use. A method of geometric construction by means of successive approximations is described in the following. Starting with a first arbitrary cam curve 5 (FIGURE 6) as a first approximation to the ideal cam curve, a second approximation curve is constructed which is closer to the ideal cam curve than the first one. The process is repeated until a satisfactory accuracy of approximation is attained.

Figures 6, 7, 8:
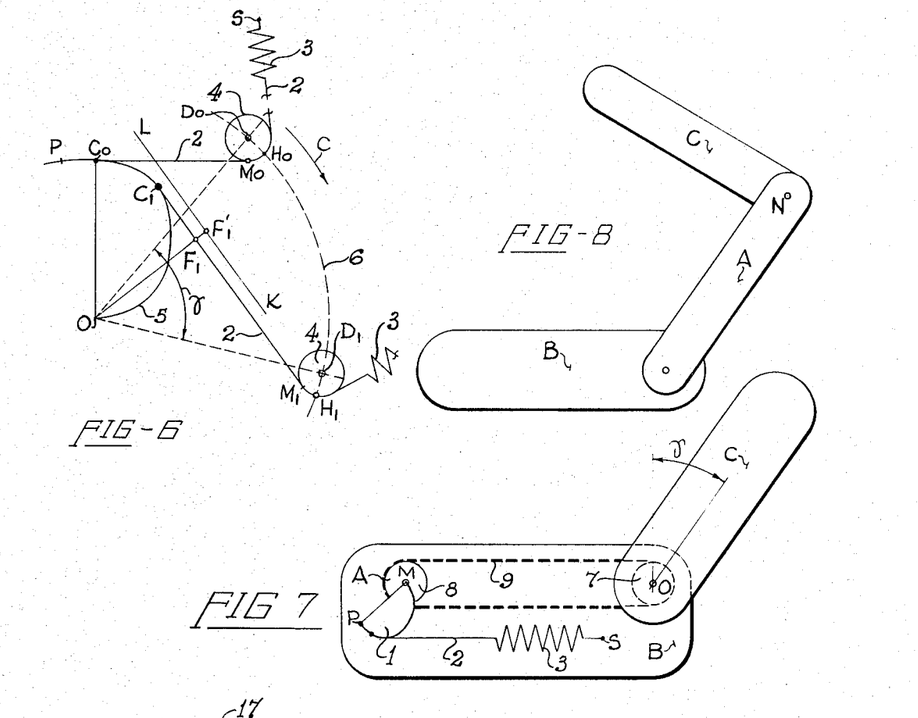
FIGURE 6 is a schematic representation of the basic balancing mechanism for reference in connection with the exposition of the method of calculating the wind-up cam.
FIGURE 7 is an adaptation of the basic balancing mechanism in which the wind-up cam is coupled by transmission means to the body to be balanced.
FIGURE 8 is an adaptation of the basic balancing mechanism in which the movable body is connected to the base body by means of an arm body.

The arrangement of the balancing means on FIGURE 6 is the same as that on FIGURE 5. As it was explained before, the choice of the arrangement of the balancing means does not affect the shape of the ideal cam curve. On FIGURE 6, the first approximation curve 5 is stationary, the spring 3 (shown schematically) is anchored at its one end to the arm body A (not shown) which rotates about the axis O. The cable 3 is diverted by a pulley 4 rotatably attached about axis $D_0$ to said arm body A. If there is no diverting pulley, like in the arrangement of the balancing means shown on FIGURE 1 or FIGURE 4, the method of construction of the cam remains the same by making the diameter of the diverting pulley 4 equal zero.

When the centre of gravity of the arm body A (not shown) is in its highest position, the centre of pulley 4 is at a point $D_0$. The cable 2 is anchored to the curve 5 at a point P. In the starting poistion cable 2 is tangent to the curve 5 at a point $C_0$ and it is tangent to the pulley 4 at a point $M_0$. When the arm body A (not shown) is rotated in direction $b$ from its starting position by angle $\gamma$, the centre $D_0$ of pulley 4 travels along a circle 6 to a point $D_1$. Said circle 6 is concentric with the axis of rotation O. Thereby the cable 2 assumes a new position, such that it passes now through the points P, $C_0$, $C_1$, $M_1$ and $H_1$. $C_1$ and $M_1$ are the new points of tangency of the cable 2 to the curve 5 and pulley 4 respectively.

As mentioned before, the weight and the dimensions of the structure to be balanced do not affect the shape of the ideal cam curve, the latter is affected, however, by a number of arbitrary geometrical parameters. Said parameters are: the starting radius $OC_0$, the starting tangency angle $OC_0M_0$, the diameter of diverting pulley 4 and the distance $OD_0$ of the centre of pulley 4 from the axis of rotation O. Values of all these parameters can be chosen to suit, except the angle $OC_0M_0$, the optimal value of the latter being 90 degrees in most cases. Once the values of said parameters have been chosen, the shape of the corresponding ideal cam curve is uniquely determined.

The ideal cam curve must be tangent to the line $C_0M_0$ and, as it was proven before, it must pass through the point O. Any curve meeting these conditions, like, for instance, curve 5 on FIGURE 6, can be considered as a first approximation to the ideal cam curve.

For the angle of rotation $\gamma$ the spring 3 is extended by the length $z$, $$z = (C_0C_1 + C_1M_1 + M_1H_1) - (C_0M_0 + M_0H_0) \quad (7)$$

wherein $H_0$ and $H_1$ are the points of intersection of circle 4, representing the operative diameter of the pulley, with said circle 6. If the exact balancing is to take place, Equation 5 must hold true.

The $t$ in said Equation 5 is represented on FIGURE 6 by the length $OF_1$, the line $OF_1$ being at right angle to the cable $C_1M_1$. The angle $OC_0M_0$ being 90 degrees, as assumed, it follows from geometrical considerations that the coefficient $k/Wd$ in Equation 5 is equal $1/\alpha^2$, wherein $\alpha$ is the length of the starting radius $OC_0$. Equation 5 can thus be written as $$\frac{zt}{\alpha^2 \sin \gamma} = 1 \quad (8)$$

Values of $z$ and $t$ for every $\gamma$, relating to the curve 5, can be measured directly on FIGURE 6. Designating the measured values of $z$ and $t$ as $z_1$ and $t_1$, the value of the left hand side of Equation 8 can thus be calculated. Because the curve 5 is only the first approximation to the ideal cam curve, $$\frac{z_1 t_1}{\alpha^2 \sin \gamma} = m_1 \quad (9)$$

wherein values of $m_1$ calculated for various $\gamma$ generally will be different from 1. How much $m_1$ differs from 1 is an indication of how far our first approximation is from the ideal cam curve. The curve 5 should be now corrected in such a way that for a certain value of $\gamma$ the corresponding $t$ (which is the distance $OF_1$) must be increased, if for that value of $m1$, or decreased if $m1$. Remembering that any increase of $t$ enlarges the curve, thereby indirectly also increasing $z$ in approximately the same proportion, the correction factor for $t$ should be $$\text{not } \frac{1}{m_1}, \text{ but } \frac{1}{\sqrt{m_1}}$$

Geometrically this procedure is equivalent to moving the point $F_1$ along the line $OF_1$ to a new location $F_1^1$, so that for said value of $\gamma$ $$\frac{CF_1^1}{CF_1} = \frac{1}{\sqrt{m_1}} \quad (10)$$

The point $F_1^1$ determines the new position $LF_1^1K$ of the tangent to the cam curve, $LF_1^1K$ being at right angle to $OF_1^1$. Finding in the same manner new positions of tangents $LF_1^1K$ for a number of different values of $\gamma$, a family of straight lines is obtained. The envelope of said family of lines is another cam curve, which is the second approximation to the ideal cam curve. The process is repeated until a satisfactory accuracy of approximation is attained, the convergence of the successive approximations to the ideal cam curve being very rapid.

The same process of construction of the ideal cam curve can be used if the spring has a non-linear characteristic, except that Equation 3 has to be used instead of Equation 5 to calculate the corrected values of $t$. Likewise, the same process of construction applies when a spring different from the coil tension spring is used and the spring is connected to the wind-up cam in a manner different from one shown on FIGURES 1, 3 and 5.

For certain values of said arbitrary parameters (for instance, when pulley 4 is too close to the axis of rotation O), an ideal cam curve does not exist. For the values of said parameters as in balancing mechanisms No. 1 and No. 2 to be described, the ideal cam curves do exist, however.

Adaptations of the basic balancing mechanism

The basic balancing mechanism with one degree of freedom depicted on FIGURE 1 can be modified, without changing anything in principle, to make it suitable for incorporation into more complex balancing mechanisms with two degrees of freedom, like ones for balancing drafting boards.

Until now the base body B has been referred to as "fixed." The balancing is not affected in any way, however, if the body B is movable, as long as it does not rotate with respect to the ground. Therefore, in the following, no restriction of being fixed is imposed on the base body B. It has also been mentioned before, than only the relative movement of the spring with respect to the wind-up cam is important; it does not matter whether the wind-up cam is rotating or stationary relative to the base body. The above and some other refinements result in the following adaptations of the basic balancing mechanism of FIGURE 1.

*Adaptation 1.*—In this adaptation depicted on FIGURE 4 and described before, the wind-up cam 1 is fastened to the base body B, and the spring 3 at its one end is anchored to the rotatable arm body A. A pulley 4 to divert the cable 2 can be used if required, (FIGURE 5) since it does not introduce any essential changes.

*Adaptation 2.*—This adaptation of the basic mechanism is exemplified by an arrangement depicted on FIGURE 7. A rigid body C is rotatably attached about an axis O to a rigid base body B. A pulley 7, fastened to the body C concentrically with the axis O is coupled by endless transmission means to a pulley 8 of the same diameter. Said pulley 8 is rotatable about an axis M, parallel to the axis O. A wind-up cam 1 is fastened to the pulley 8. A cable 2 and a spring 3 are connected to the wind-up cam 1 and to the base body B in the same manner as in the basic balancing mechanism of FIGURE 1. By this arrangement actually it is the body C which is balanced, but in effect the pulley 8 is equivalent to the balanced body A of basic mechanism of FIGURE 1. The member C need not necessarily be connected to the base body B as shown, as long as the coupling means between the cam 1 and the body C are such that rotation of the member C causes rotation of the cam 1 and vice-versa.

*Adaptation 3.*—This adaptation is schematically depicted on FIGURE 8. An arm body A at its one end is rotatably attached about an axis O to a base body B. A movable body C is rotatably attached about an axis N to the distal end of the arm body A. Said axis N is parallel to said axis O. If rotation of the movable body C about the axis N relative to base body B is balanced independently from the position of the body A, which is possible, then the arm body A can be balanced for rotation about said axis O relative to base body B independently from the position of the movable body C. In this case the arm body is balanced in the same manner as shown on FIGURE 1 or FIGURE 4, except that the effective weight of the arm body A is equal the sum of the actual weights of the bodies A and C.

The above adaptations of the basic balancing mechanism can be incorporated in a balancing mechanism for drafting board in a variety of ways. To exemplify the invention, balancing mechanisms No. 1 and No. 2 and modifications thereof are described in detail in the following.

Balancing mechanism No. 1

Figures 9, 10, 11:
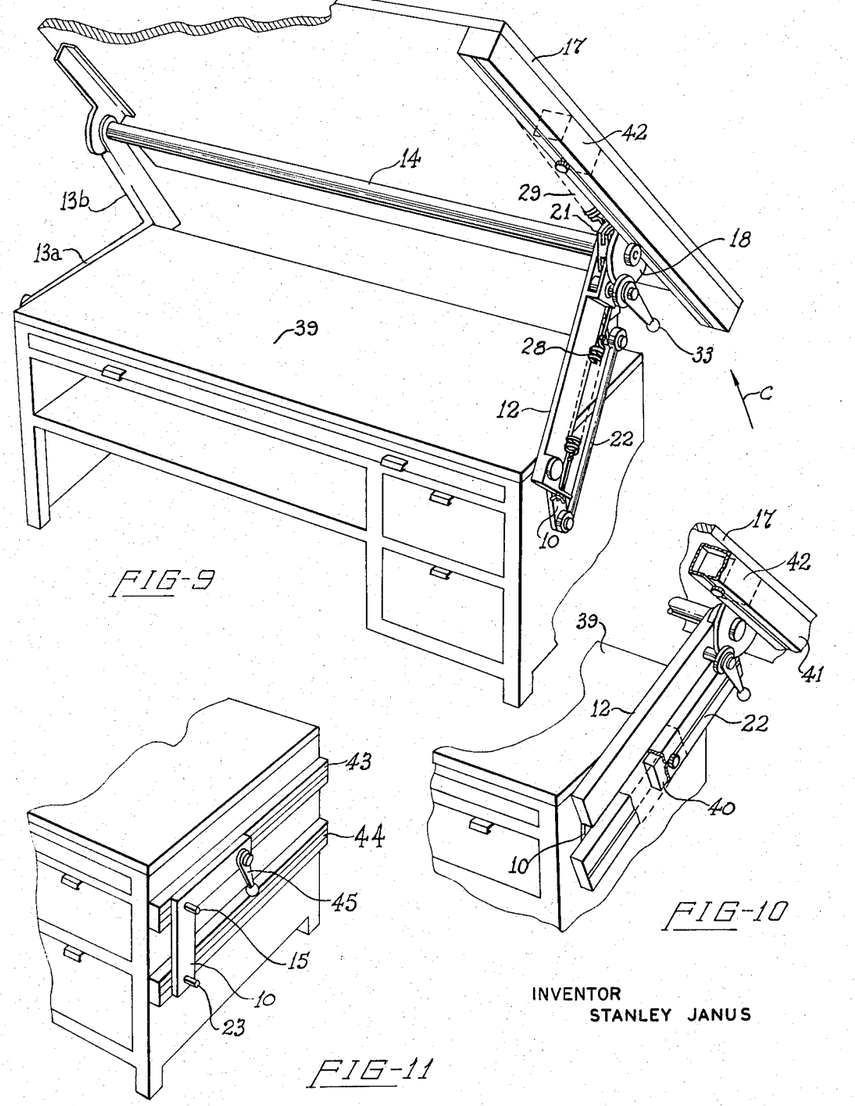
FIGURE 9 is a perspective view of a combination of the balancing mechanism No. 1 with a desk.
FIGURE 10 is a perspective view of an alternative execution of the main arm and connecting rod in mechanism No. 1.
FIGURE 11 is a fragmentary perspective view of an alternative way of attaching balancing mechanism No. 1 to the desk.
Figure 12:
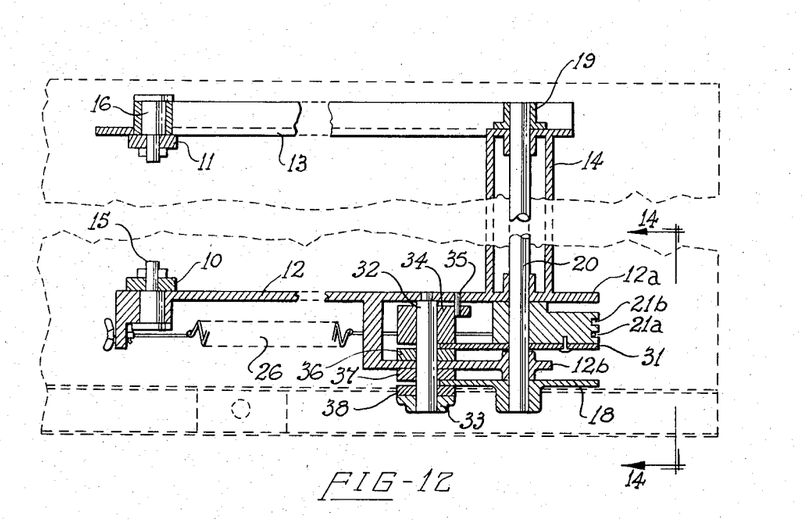
FIGURE 12 is a section taken on line 12—12 of FIGURE 13.
Figure 13:
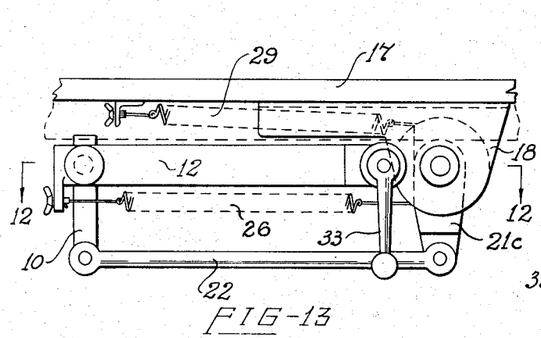
FIGURE 13 is a side view of the balancing mechanism No. 1.
Figure 14:
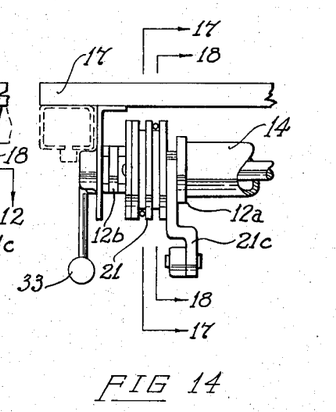
FIGURE 14 is a fragmentary view at FIGURE 12 in the direction 14.

A perspective view of the mechanism No. 1, in combination with a desk, which is one embodiment of the invention, is depicted on FIGURE 9. FIGURES 12, 13, and 14 depict this mechanism in more detail.

The balancing mechanism No. 1 consists essentially of a base structure, an arm structure, a board structure, a base follower, coupling means and operative means, the latter including first and second balancing means and locking means. The arm structure and board structure correspond to arm body A and movable body C respectively, as shown on FIGURE 8.

The base structure consists of two base brackets 10 and 11 and of a desk 39 to which they are fastened. Instead of a desk a stand or any other kind of support can be used.

The arm structure consists of two arms 12 and 13 welded to a tube 14 so as to form a rigid U-shaped structure. The arm 13 is of a boomerang shape, so that within the usual range of adjustment of the height of the board 17 a portion 13a of the arm 13 (FIGURE 9) does not raise above the top surface of the desk. Thus it is possible to spread large drawings on top of the desk which can extend beyond one side of the desk over the boomerang arm. The swinging end of the arm 12 has the shape of a two-legged fork, the legs of said fork being designated 12a and 12b. The arm structure can be rotated in direction C and reverse about a first axis on two stub shafts 15 and 16, fastened to the base brackets 10 and 11 respectively.

The board structure consists of a drafting board 17, of hinge brackets 18 and 19 fastened to said board and of a board shaft 20 pinned to each of said brackets. Said board, two brackets and board shaft form a rigid structure, which can be rotated about a second axis on shaft 20. The latter is supported in a bearing in the arm 13 and in bearings in each of the legs 12a and 12b of the arm 12. Said second axis is parallel to said first axis.

Figure 15:
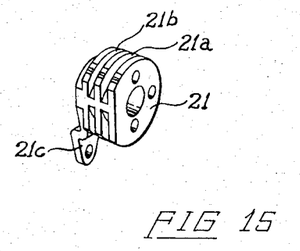
FIGURE 15 is a perspective view of the combination of the base follower and two wind-up cams in the balancing mechanism No. 1.

A grooved cylindrical part 21 (FIGURES 12, 14 and 15) with an integral crank 21c is freely rotatable on the shaft 20. Said part 21 is connected by coupling means to the base structure in such a manner that it does not rotate relative to the base structure, when the arm structure is rotated about said first axis. This is why it is called a "base follower." Said coupling means are a parallelogram linkage (FIGURE 16) made up of the arm 12, the base follower 21, a connecting rod 22 and the base bracket 10. Centres of pivots 15, 23, 20 and 24 are the apexes of said parallelogram. In the base follower 21, the bottoms of annular grooves 21a and 21b form working surfaces of wind-up cams to balance the height and the angle of inclination of the board.

The first balancing means serve the purpose of balancing rotation of the arm structure about said first axis and comprise a wind-up cam 21a (FIGURE 17), which is an integral part of the base follower, a cable 25 and a tension spring 26. One end of said cable 25 is anchored at point H to said cam 21a and its other end is attached to the free end of the tension spring 26, the latter being anchored at its other end by means of a screw 27 to the arm 12. The base follower does not rotate with respect to the ground, therefore, this balancing arrangement can be considered a combination of adaptations 1 and 3 of the basic balancing mechanism, described previously. In this case the base body B is the base follower 21, the arm body A is the arm structure and the body C is the board structure of the balancing mechanism No. 1, the effective weight of the arm structure being the sum of the actual weights of the arm structure and the board structure.

The second balancing means serve the purpose of balancing rotation of said board structure about said second axis. Said second balancing means comprise essentially a cam 21b (FIGURE 18), a cable 28 and a tension spring 29. The cable 28 is anchored at its one end at a point L to the cam 21b, the tension spring 29 being interposed between the other end of the cable 28 and the board 17, said spring 29 being anchored to said board by means of an adjusting screw 30. This balancing arrangement can be considered an adaptation 1, described previously, of the basic balancing mechanism. In this case the base body B is the base follower 21 and the body A is the board structure. The base follower 21 is used for locking purposes as well. The locking of both the height and the angle of inclination of the board is accomplished by clamping together the arm 12, the base follower 21 and the board hinge bracket 18. For this purpose a circular disc 31 (FIGURE 12), concentric with the board shaft 20 and at right angle to it, is fastened to the base follower 21. Likewise, an integral part of board hinge bracket 18 has the shape of a part of a disc, concentric with said board shaft 20. The board follower disc 31 and the board hinge disc 18 are of the same diameter and their edges are close to a brake shaft 32, parallel to the shaft 20. Said brake shaft 32 with a brake handle 33 (FIGURE 13) wastened to its end can be rotated on bearings in both arm legs 12a and 12b. A portion of the brake shaft 32 is threaded and a collar 34 is screwed onto it. Said collar 34 has a projection which can slide along a pin 35, the latter preventing collar 34 from rotation with shaft 32. Friction washers 36 and 37 and a thrust bearing 38 are sliding freely along the shaft 32. When the brake handle 33 is rotated in one direction, collar 34 is prevented from rotation with shaft 32 by pin 35 and is forced to move axially by the screw action. Thereby the base follower disc 31, the arm leg 12b and the board hinge disc 18 are clamped between the hub of the handle 33 and collar 34, thus locking both the height and the angle of inclination of the board. When the handle 33 is rotated in the opposite direction, the board is unlocked.

Instead of a thread on the shaft 32 to produce the clamping action, a wedge or a barrel cam brought into action by the rotation of said shaft 32 can be used equally well.

A better construction of arm 12 as the one on FIGURE 9, is depicted in a fragmentary view on FIGURE 10. Here the arm 12 is made of sheet metal and is hollow inside to conceal the spring. Similarly, such a hollow arm could even conceal inside the connecting rod 22 (this arrangement not shown on FIGURE 10). The connecting rod 22 (FIGURE 10) is made as a semi-tubular track to accommodate inside a slidable weight 40, the position of which is adjustable along the track 22. A similar semi-tubular track 41 with a slidable weight 42 is attached to the board 17. By changing the position of weight 42 in the track 41 the adjustment of balancing about said second axis can be effected, the latter, however, not affecting in any way the balancing about said first axis. The adjustment of balancing about said first axis is accomplished by moving the weight 40 along the track 22. Alternatively, it is possible to adjust balancing about both first and second axes using track 41 only, by varying both the size and location of the weight 42.

The base brackets 10 and 11 instead of being fastened to the desk frame, can be made adjustable along horizontal tracks. In this way it is possible to adjust the position of board in the horizontal direction so as to make more or less leg room for the draftsman. Such an arrangement is exemplified on FIGURE 11. The position of the base bracket 10, equipped with a locking device 45, is adjustable along tracks 43 and 44.

*Balancing mechanism No. 2*

Balancing mechanism No. 2 is depicted on FIGURES 19 to 23. It consists essentially of a base structure, an arm structure, a board structure, a base follower, a board follower and operative means, the latter including coupling means for the base and board followers, first and second balancing means and locking means. The arm structure and board structure correspond to arm body A and movable body C respectively of FIGURE 8.

The base structure consists of two base brackets 46 and 47 and of the desk to which said brackets are fastened. Instead of a desk a stand or another kind of support can be used.

The arm structure consists of two arms 48 and 49 which are welded to a tube 50 as to form a rigid U-shaped structure. The arm 49 is of a boomerang shape. Said arm structure is rotatably connected about a first axis by means of pivot shafts 51 and 52 to the base brackets 46 and 47 respectively.

The board structure consists of a drafting board 53, of hinge brackets 54 and 55 and of a board shaft 56. The board shaft 56 is pinned to each of said brackets 54 and 55. The board, two brackets and board shaft form a rigid structure which can be rotated about a second axis on the shaft 56 in bearings in the ends of arms 48 and 49. Said second axis is parallel to said first axis.

The base follower is a pulley 57 (FIGURE 21) freely rotatable about the board shaft 56. Said pulley 57 is connected by coupling means to the base structure in such a manner that irrespective of any rotation of the arm structure about said first axis, the pulley 57 does not rotate relative to the base structure. Said coupling means consists of a pulley 60 fastened to the base bracket 46 and two cables 58 and 59. The pulley 60 is of the same diameter as the pulley 57. Cable 58 is anchored to the pulley 57 at a point T and cable 59 is anchored to the pulley 60 at a point V, the ends of said cables 58 and 59 being connected by tensioning and adjusting devices 61.

In the mechanism No. 2 the base follower is used only for locking the height and angle of inclination of the board. The locking device operated by a handle 72 (FIGURE 19) works on the same principle as one in the mechanism No. 1.

The first balancing means serve the purpose of balancing the rotation of arm structure about said first axis. They consist of a wind-up cam 62 (FIGURES 19 and 23), a cable 63 and a tension spring 64. The middle portion of the shaft 52 is rotating freely in the base bracket 47. One end of said shaft is pinned to the arm 49, while its other end has a wind-up cam 62 fastened at right angle to it. Consequently, the cam 62 is rigidly connected to the arm 49 and rotates with it and with the shaft 52 as a single unit in the base bracket 47. This balancing arrangement is equivalent to a combination of the basic balancing mechanism (FIGURE 1) and its adaptation No. 3 (FIGURE 8), described previously, wherein the arm body A is the arm structure, the base body B is the base structure and the movable body C is the board structure of the mechanism No. 2. The effective weight of the arm structure is the sum of the actual weights of the arm structure and the board structure.

The second balancing means serve the purpose of balancing the rotation of the board structure about said second axis. They consist, essentially, of a wind-up cam 66, a cable 67 and a tension spring 68. The latter two items are not well visible on FIGURE 19, but the arrangement of said second balancing means is just a mirror image of the arrangement of the first balancing means depicted on FIGURE 23. The middle portion of the pivot shaft 51 is rotating freely in the end of arm 48, in the bracket 46 and in the stationary pulley 65. Said shaft 51 has on its one end a wind-up cam 66 and on the other end the board follower pulley 65 fastened to it. Consequently, the wind-up cam 66 is rotating about said first axis in unison with the board follower pulley 65.

The board follower pulley 65 (FIGURE 22) is connected by coupling means to the drafting board 53 in such a manner that rotation in direction C of said board relative to the base structure by a certain angle, causes rotation of the board follower 65 relative to the base structure by the same angle. Said coupling means consist of an idler pulley 69 and a cable 70. The idler pulley 69 is turning freely on the board shaft 56. The cable 70 is anchored at its one end by an adjusting screw 71 to the board 53 and on its other end it is anchored at a point V to the pulley 65, a part of said cable 70 being wound on the idler pulley 69. The idler pulley 69 serves merely the purpose of diverting the cable 70, the latter not being anchored to said pulley 69. The cable 70 is crossed relative the two pulleys 65 and 69, to make the wind-up cam 66 rotate in a direction opposite to the direction in which the board 53 is rotated, this arrangement giving a better mounting location for the balancing spring 68. Except for that, the cable 70 can be connected to the pulley 65 in such a manner that the latter rotates in the same direction as the board, with equivalent results.

The board follower pulley 65 is of the same diameter as the idler pulley 69. If the board structure is rotated relative to the base structure about said second axis by an angle $\gamma$, while the arm structure is stationary, the follower pulley 65 rotates relative to the base structure by the same angle $\gamma$. If, however, the angle of inclination of the board 53 (relative to the base structure) remains constant, while the arm structure is rotated about said first axis, the pulley 65 does not rotate (relative to the base structure). Thus, by means of the board follower pulley 65 and said second balancing means it is possible to balance the board 53 for its angle of inclination irrespective of its height. This balancing arrangement is equivalent to the adaptation 3, described previously, of the basic balancing mechanism, (FIGURE 7), wherein the member B is the base structure, the member A is the board follower 65 and the member C is the board structure of the balancing mechanism No. 2.

The single cable coupling means, just described, between the mechanism No. 1, except that the wind-up cam 21a (FIGURE 17), which balances rotation of the arm structure about said first axis, is replaced by a circular wind-up pulley.

Connection with a spring, is much better than endless type, because no cable tensioning and adjusting devices 61 are needed, no backlash can develop and manufacturing costs are lower.

In both mechanism No. 1 and No. 2 it is quite practical to vary the angle of rotation $\gamma$ from 0 to 90 degrees for the board and from 0 to 120 degrees for the arm structure, with exact balancing for all intermediate values of $\gamma$.

*Modifications of the balancing mechanisms No. 1 and No. 2*

Apart from the wind-up cam, the present invention relates to the means and manners of incorporating said wind-up cam into balancing mechanisms with two degrees of freedom, said means including such devices as the base follower, single cable coupling, etc. It is obvious that the nature of the present invention remains the same if the described embodiments of the invention a circular wind-up pulley is substituted for a wind-up cam. As it was explained in connection with FIGURES 2 and 3, a circular wind-up pulley generally is much inferior to the wind-up cam, but due to its lower manufacturing costs its use may present some advantages. In particular, a circular wind-up pulley may be used to advantage for small values of the angle of rotation $\gamma$, say, $\gamma$ not exceeding 30 degrees, in which case, as it was explained before, a good approximation to the exact balancing is obtained. By replacing in the mechanism No. 1 or No. 2 a wind-up cam by a circular wind-up pulley and/or replacing said first or second balancing means by an equivalent adaptation of them described previously, some other balancing mechanisms can be obtained. A few useful ones are described in the following.

Figure 17:
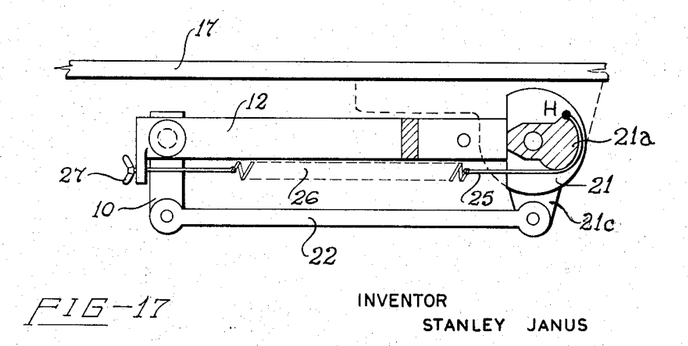
FIGURE 17 is a section taken on line 17—17 of FIGURE 14.
Figures 19, 20, 22:
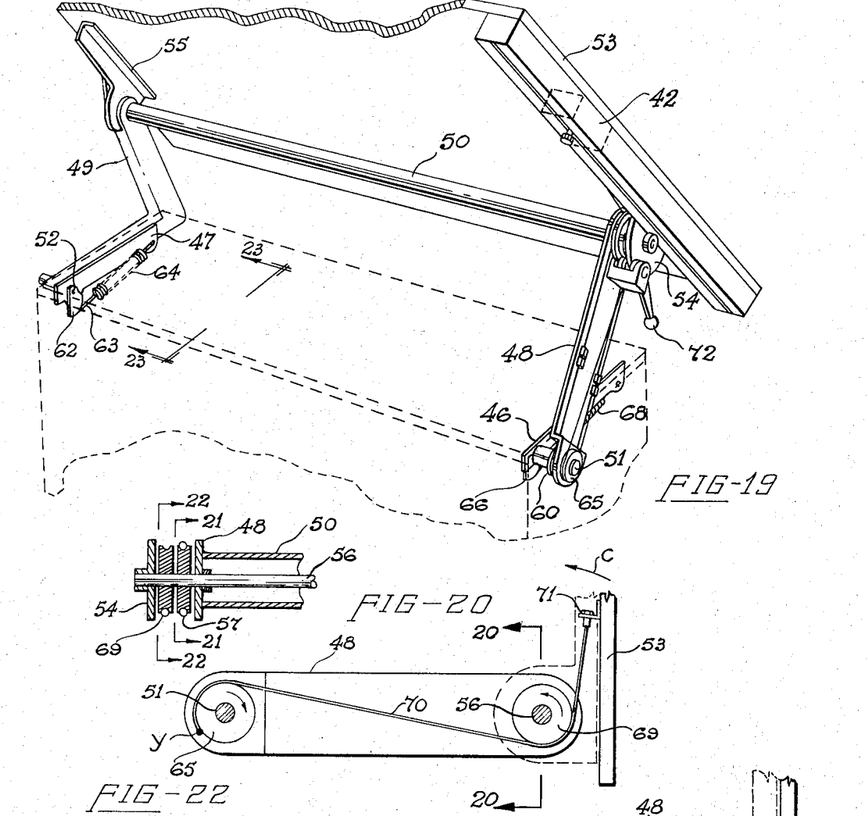
FIGURE 19 is a perspective view of the balancing mechanism No. 2.
FIGURE 20 is a section taken on line 20—20 of FIGURE 22.
FIGURE 22 is a section taken on line 22—22 of FIGURE 20; the base follower coupling cables shown on FIGURE 21 are omitted on this figure.
Figure 21:
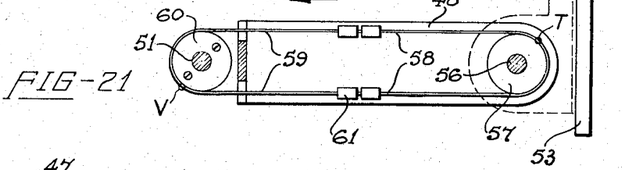
FIGURE 21 is a section taken on line 21—21 of FIGURE 20.
Figure 23:
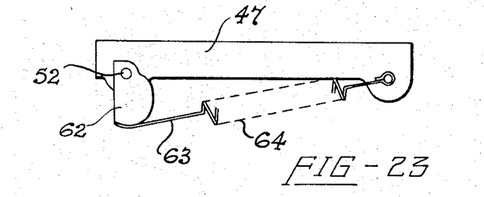
FIGURE 23 is a fragmentary view at FIGURE 19 in the direction 23 showing balancing means to balance the arm structure.

(1) A balancing mechanism which is the same as the balancing board follower pulley 65 and the board 53 are, in effect, equivalent to the coupling between pulleys 65 and 57 (FIGURE 21) in which endless transmission means are used. Said single coupling means, if used in (2) A balancing mechanism as under (1) in which said wind-up pulley 73 (FIGURE 24) is fastened to the base follower 78, said mechanism containing additionally a wind-up pulley 74 and an idler pulley 75. The idler pulley is used here in the same manner as in the adaptation, depicted on FIGURE 5, of the basic balancing mechanism. The wind-up pulleys 73 and 74 are of the same diameter, concentric with said second axis. The pulley 74 is fastened to the arm structure. The spring 75 and the cable 76 (FIGURE 24) correspond to the spring 26 and the cable 25 of the mechanism No. 1 (FIGURE 17). A piece of cable 77 at its one end is attached to the hitherto fixed end of the spring 75, the other end of said cable 77 being anchored to the wind-up pulley 74, thus making the spring 77 "floating." The idler pulley is used only to divert one of the two cables 76 or 77. The deflection of the spring 75 depends only on the angle of rotation of the arm structure relative to the base follower, or relative to the base structure. It does not matter whether the idler pulley 75 is rotatably attached to the arm 13, as shown on FIGURE 24, or to the board 17. The advantage of the latter arrangement is that the arm structure can be balanced by means of a spring mounted underneath the board.

(3) A balancing mechanism which is the same as the balancing mechanism No. 1, except that the wind-up cam 21b (FIGURE 18), which balances the inclination of the board, is replaced by a circular wind-up pulley.

Figures 16, 18:
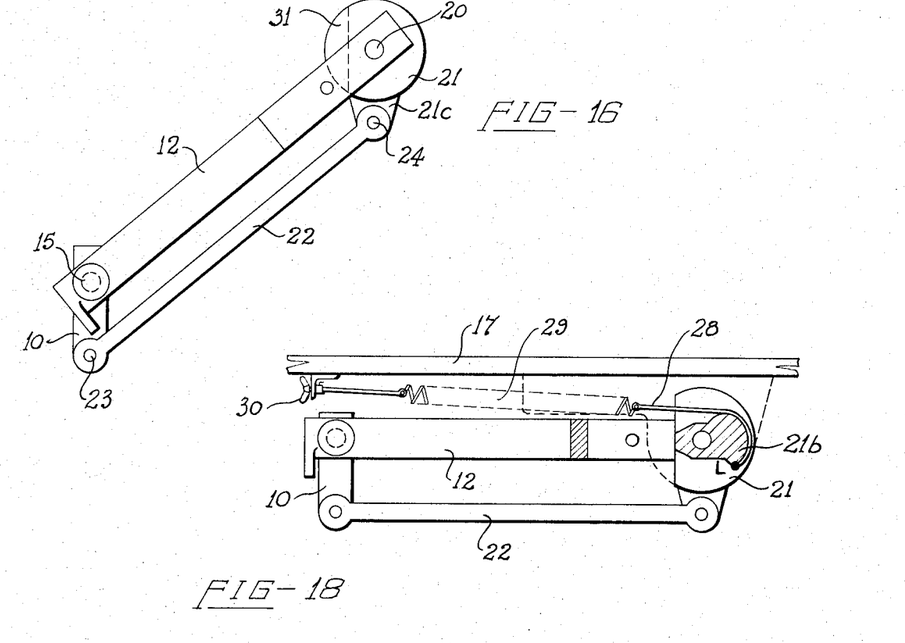
FIGURE 16 is a side view of the main arm and connecting rod in raised postion in the mechanism No. 1.
FIGURE 18 is a section taken on line 18—18 of FIGURE 14.

(4) A balancing mechanism as under (3) in which said wind-up pulley is a pulley 74 attached to the base follower 78, said mechanism containing additionally a wind-up pulley 73 and an idler pulley 75. The wind-up pulleys 73 and 74 are of the same diameter, concentric with said second axis. The pulley 73 is fastened to the board structure and rotates with it. The spring 75 and the cable 76 (FIGURE 24) correspond to the spring 29 and the cable 28 of the mechanism No. 1 (FIGURE 18). A piece of cable 76 at its one end is attached to the hitherto fixed end of the spring 75, the other end of said cable 76 being anchored to the wind-up pulley 73, thus making the spring 77 "floating." The idler pulley is used only to divert one of the cables 76 or 77. The deflection of the spring 77 depends only on the angle of inclination of the board 17. It does not matter whether the idler pulley 75 is rotatably attached to the arm 13, as shown on FIGURE 24, or to the board 17. The advantage of the former arrangement is that the spring 77 balancing the board can be hidden inside of the arm 13.

(5) A balancing mechanism which is the same as the balancing mechanism No. 2, except that the wind-up cam 66 for balancing the inclination of the board is replaced by a circular wind-up pulley.

Figures 24, 25:
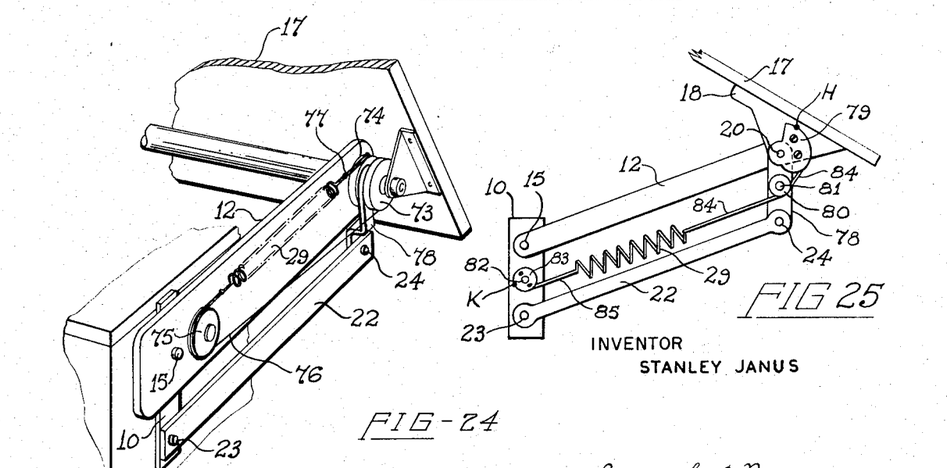
FIGURE 24 is a fragmentary perspective view of the modified balancing mechanism No. 1 showing modified balancing means to balance the inclination of the drafting board, or to balance the arm structure, whichever is the case, depending on connections.
FIGURE 25 is a side view of another balancing mechanism for exact balancing of the angle of inclination only of the drafting board by means of a tension spring parallel to the arm.

A further embodiment of balancing the inclination of the drafting board by means of a spring which is parallel to the arm and which can be concealed within the arm structure is shown on FIGURE 25. In this case a wind-up cam can be used to achieve exact balancing for every $\gamma$. On FIGURE 25 parts 10, 12, 15, 17, 18, 20, 22 and 24 are the same ones as parts bearing the same numbers of reference on FIGURES 13, 16 and 24. An arm 12 and a connecting rod 22 are pivoted by pivots 15 and 23 respectively to a base structure 10. The distal ends of the arm 12 and of the connecting rod 22 are pivoted by pivots 20 and 24 respectively to a base follower 78. The pivots 15, 23, 20 and 24 are apexes of a parallelogram. A drafting board 17 has a hinge bracket 18 fastened to it which is pivoted by the same pivot 20 to the base follower 78. A wind-up cam 79 is fastened to the hinge bracket 18 and thus it turns with the board on pivot 20. An idler pulley 80 is pivoted about pivot 81 to the base follower 78. Another pulley 82 of the same diameter as pulley 80 is rigidly fastened to the base structure 10. The centre 83 of pulley 82 and pivots 15, 20 and 81 are apexes of a parallelogram. A cable 84 is fastened at its one end to the cam 79 at point H and at its other end it is fastened to one end of a tension spring 23. Another end of spring 23 is fastened to one end of a cable 85. The other end of the cable 85 is wound on pulley 82 and is fastened to it at a point K. When the arm 12 is swung up or down on pivot 15, the inclination of the drafting board relative to the base 10 remaining unchanged, as much cable is wound-up on pulley 82 as it is unwound on pulley 80 (or vice-versa), so that the movement of arm 12 has no effect on the tensioning of the spring 23. Only changing of the angle of inclination of the drafting board winds-up or releases the cable 81, in effect producing the same balancing action as in the basic balancing mechanism shown on FIGURE 1. Balancing of the movement of arm 12 can be done independently by any other method.

It is further obvious, that in any of the described balancing mechanisms for the drafting board, the said first balancing means for balancing the rotation about said first axis are completely independent from the second balancing means for balancing the rotation about said second axis. Therefore, in a balancing mechanism for drafting board of the class described, with two degrees of freedom, any kind of the said first balancing means can be used with any kind of the said second balancing means.

What I claim is:

1. A balancing mechanism for a group of at least two bodies including a base body wherein a straight line passing through any two points thereof remains at a constant angle of inclination with respect to a horizontal plane, and including a movable body connected to said base body by connecting means establishing at least one axis for rotation of said movable body relative to said base body, said balancing mechanism being provided for a said axis of rotation of said movable body operatively interposed between said bodies and including:

a cam member axially pivoted to one of said bodies and having cam surfaces thereon said cam being locked against rotation relative to said base body;

cable means attached by one end to said cam member and extending partially around camming surfaces thereof;

and spring means connected between the other end of said cable means and said one body urging said cable to unwind from said cam and to rotate the same relative to said one body, said spring means yielding to rotation of said cam in the reverse direction to permit winding of said cable thereon when said movable body is rotated about said axis as to lower its centre of gravity relative to said base body.

2. A balancing mechanism for a group of at least three bodies each said body being rotatably connected to at least one other said body, including a stationary base body, a movable body, and a connecting body being axially pivoted at its one end to said base body and at its other end being axially pivoted to said movable body, establishing separate first and second axes of rotation for said movable body relative to said base body, a said balancing mechanism being provided for said first axis of rotation operatively interposed between said base body and said connecting body and including:

a cam member fixed to said base body and having cam surfaces thereon;

cable means attached by one end to said cam member and extending partially around the camming surface thereof;

and spring means connected between the other end of said cable means and said connecting body.

3. A balancing mechanism for use between a stationary base and a movable body connected thereto by means establishing an axis for rotation thereof and comprising:

a cam member mounted for rotational movement relative to one of said bodies and having cam surfaces thereon;

cable means attached by one end to said cam member and extending partially around said cam surfaces thereof;

and spring means connected between the other end of said cable means and said one body.

4. A balancing mechanism as claimed in claim 3 wherein said cam member is connected to said moveable body for rotational movement in union therewith relative to said stationary body.

5. A balancing mechanism as claimed in claim 3 wherein said cam member is fastened to said stationary body for relative rotational movement as between said cam member and said moveable body.

6. A balancing mechanism as claimed in claim 3 wherein said cam member is rigidly fastened to said stationary body and including pulley means on said moveable body, said cable means extending around said pulley means and connected to said moveable body on one side thereof and said cam member on the other side thereof, said spring means being located on either said side thereof.

7. A balancing mechanism for a group of three bodies including a stationary base body, a connecting body rotatably attached to said stationary body and a moveable body rotatably attached to said connecting body at a different axis of rotation, thereby establishing separate first and second axes of rotation for said moveable body, said balancing mechanism being provided for said second axis of rotation and comprising:

a cam member fixed to said connecting body and having cam surfaces thereon;

cable means attached by one end to said cam member and extending partially around the camming surface thereof; and spring means connected between the other end of said cable and said moveable body.

References Cited

UNITED STATES PATENTS

| 2,539,700 | 1/1951 | Pieper | 108—2 |
| 2,988,843 | 6/1961 | Knudson | 108—2 |
| 3,078,613 | 2/1963 | Moreheles | 108—2 |
| 3,131,654 | 5/1964 | May et al. | 108—2 |
| 3,161,159 | 12/1964 | Kritske | 108—2 |
| 3,183,860 | 5/1965 | Kritske | 108—2 |
| 3,267,878 | 8/1966 | Faux et al. | 108—2 |

FOREIGN PATENTS

| 1,271,094 | 7/1961 | France. |
| 1,357,555 | 2/1964 | France. |

BOBBY R. GAY, *Primary Examiner.*

FRANK B. SHERRY, *Examiner.*

GLENN O. FINCH, *Assistant Examiner.*